United States Patent Office 3,241,220
Patented Mar. 22, 1966

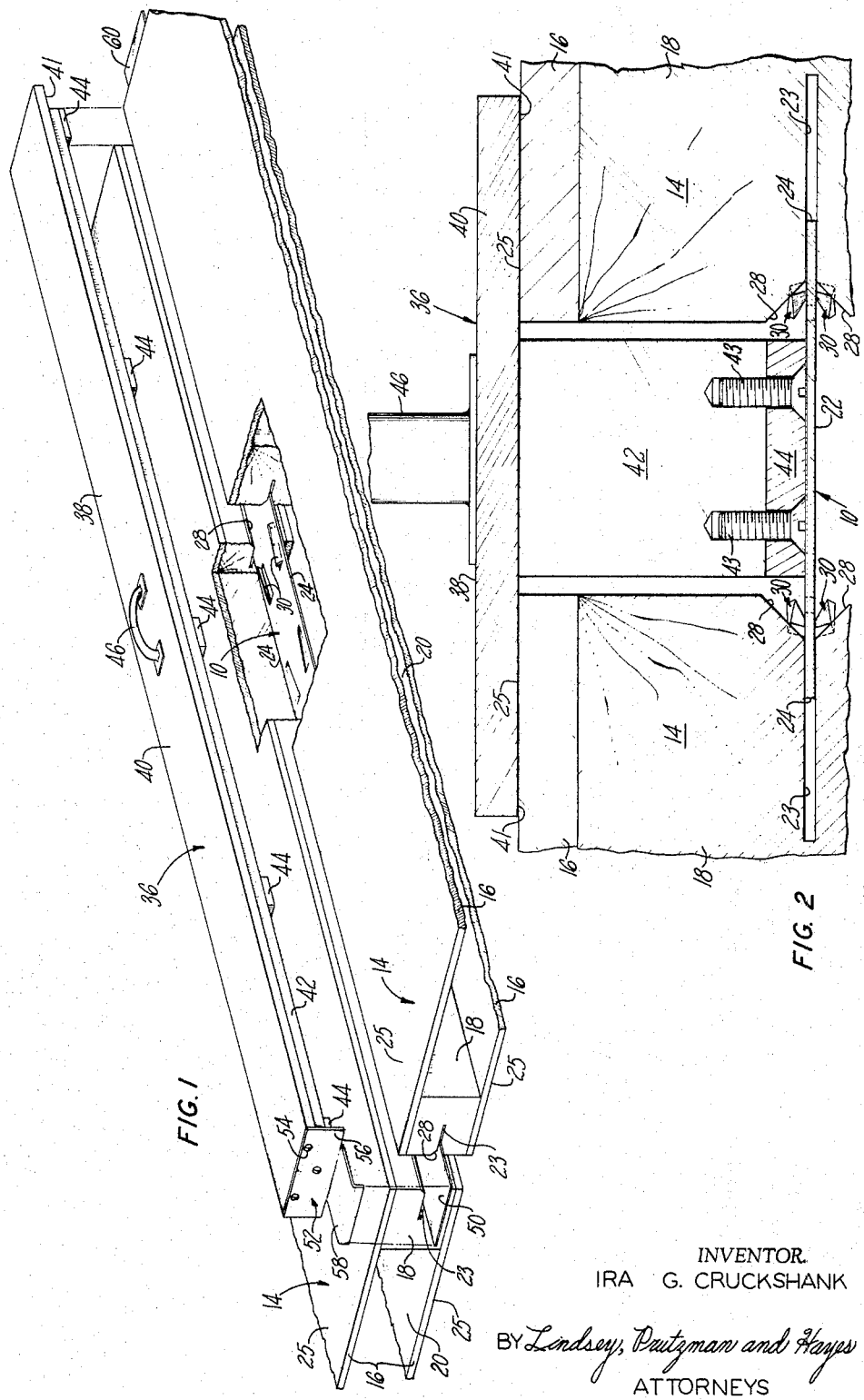

3,241,220
JOINT PREASSEMBLING JIG
Ira G. Cruckshank, Kensington, Conn., assignor to The Stanley Works, New Britain, Conn., a corporation of Connecticut
Filed May 22, 1963, Ser. No. 282,306
4 Claims. (Cl. 29—200)

The present invention relates to joints of the type having a fastener inserted in opposed slots formed in contiguous surfaces of the joint members, and more particularly to a jig for preassembling the fastener and joint members for the subsequent setting of the joint.

Joints of the type to which the present invention is directed conventionally incorporate a fastener having a plurality of teeth which are adapted to engage the joint members and which upon advancement of the fastener along the slots bring the joint members into abutment. The coaction between the teeth and the joint members provides for securing the joint with the preloading on the joint being a function of the displacement of the fastener along the slots. Conventionally, the joint is assembled by first inserting the fastener laterally in the slots until the teeth engage the joint members and thereby develop sufficient resistance to prevent further lateral movement of the fastener, and by subsequently displacing the fastener along the slots with an appropriate tool. The joint members and fastener are therefore preassembled with the joint members spaced apart and the fastener laterally inserted in the slots. In such preassembly, the position of the fastener and joint members is crucial and inaccuracies result in the assembly of a joint having less than optimum strength through uneven distribution of the joint preloading or a preloading which differs from the predesigned optimum preloading. It is therefore a principal aim of the present invention to provide a jig for positioning the fastener and joint members to ensure that upon subsequent assembly an optimum joint is provided.

Another aim of the present invention is to provide a jig of the type described which is manually operable for rapid and convenient assembly of the fastener and joint members.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawing:
FIG. 1 is an isometric view, partly broken away, of the parts of a joint preassembled by a jig of the present invention shown removed therefrom; and
FIG. 2 is a transverse section view, partly broken away, of the jig installed in a preassembled joint.

Referring now to the drawing in detail, a preferred embodiment of the jig of the present invention is shown for assembling an elongated fastener, generally denoted by the numeral 10, with a pair of joint members, here shown to be a pair of panels 14 having spaced face members 16 fixed to elongated edge members 18 to give a rigid panel construction having an insulating chamber 20.

The fastener 10, hereinafter termed a spline, has an elongated body 22 usually constructed of sheet stock spring steel, such as steel strapping, with elongated parallel edges 24. The spline body is adapted to be received within a pair of opposed slots or kerfs 23 formed, as by sawing, in the contiguous edges of the joint panels. The kerfs have sufficient depth to receive the entire spline body when the panels 14 are in abutting engagement, and the edge members 18 may be chamfered at 28 for assisting the insertion of the spline into the kerfs. A plurality of pairs of laterally spaced teeth 30 are longitudinally spaced along the spline body with each pair of teeth being symmetrically located with respect to the lateral center line of the spline. The teeth are usually formed integrally with the spline body by cutting or slitting the body and deforming or bending a portion of the body outwardly and are positioned at a given inclination with respect to the longitudinal axis of the spline. Selected teeth are formed on each side of the spline body for engagement at both sides of the kerfs 23. Conventionally, the joint is united by first assembling the spline laterally in the kerfs until the teeth 30 are in cutting engagement with the edge members 18, as seen in FIG. 2, and thereby develop sufficient resistance to prevent further lateral movement of the spline. The joint is then set by longitudinally displacing the spline in the kerfs with the result that the teeth coact with grooves cut thereby in the edge members 18 to bring the panels into abutment.

In accordance with the present invention, the spline and panels are readily and accurately preassembled for subsequent setting of the joint by a jig, generally denoted by the numeral 36. The jig 36 has an elongated body 38 preferably substantially equal to the length of the joint, the panel members 14 being desirably joined along the entire length of their contiguous edges. The jig body 38 has a face or guide portion 40 providing a pair of oppositely projecting shoulders or lips 41 and a central portion 42 depending centrally therefrom, and is preferably manufactured of aluminum or other nonmagnetic material. A plurality of longitudinally spaced permanent magnets 44 are secured to the underside of the depending portion 42, as by machine screws 43, and are of sufficient magnetic strength to retain a spline thereon for manual manipulation of the jig, for which purpose a handle 46 fixed to the face portion 40 of the jig is provided. Accordingly, a spline 10 retained on the jig by the magnets 44 can be positioned for assembly with the joint members 14. In the process of inserting the spline into the kerfs 23, the panels are first spaced apart a distance greater than the width of the spline but preferably less than the width of the jig face portion 40, and the spline is placed into position between the panels by the jig. The combined thickness of the central portion 42 and the magnets 44 is designed to be equal to the distance of the kerfs 23 from an outer surface 25 of the panels, with the result that the spline will be positioned between the panels in alignment with the opposed kerfs 23 when the jig shoulders 41 rest on the panels. Thereafter, one or both of the panels are laterally displaced for inserting the spline into the kerfs 23 until the spline teeth 30 are in cutting engagement with the edge members 18.

In order that the spline will extend the full length of the joint when the joint is set, the spline is positioned in the kerfs 23 so that the tail end 50 of the spline extends beyond the panel edges, as seen in FIG. 1, a distance equal to the longitudinal displacement of the spline during the setting of the joint. This longitudinal positioning of the spline is provided by a bracket 52 fixed as by machine screws 54 to one end of the jig body. The bracket has a laterally extending portion 56 providing shoulders for abutting the edges of the panels for positioning the jig longitudinally on the panels and a longitudinally and laterally extending portion 58 providing an abutment for engagement by the tail end of the spline for longitudinally positioning the spline relative to the jig. Consequently, with the bracket portion 56 in engagement with the panel edges and the spline in engagement with the bracket portion 58, the spline is appropriately positioned longitudinally in the panel kerfs for subsequent setting of the joint. The head of the spline is provided with an extension or tab 60 which may be gripped by an appropriate tool for displacing the spline longitudinally in the panel kerfs and thereby set the joint.

It can be seen therefore that with the jig of the present invention, the spline can be appropriately preassembled with the panels so that there is ensured, upon subsequent setting, a joint having optimum and evenly distributed loading thereon. Additionally, the jig of the present invention allows for rapid and facile assembly and setting of the joint.

As will be apparent to persons skilled in the art, various modifications and adaptations of the structure above described will become readily apparent without departure from the spirit and scope of the invention, the scope of which is defined in the appended claims.

I claim:

1. For use in joining a pair of members along elongated surfaces thereof with an elongated fastener having a plurality of longitudinally and laterally spaced teeth inclined to the longitudinal axis of the fastener, the joining being accomplished by laterally inserting the fastener into opposed slots in the elongated surfaces until the fastener teeth are in engagement with the members and by displacing the fastener longitudinally in the slots, a jig for preassembling the fastener and members comprising a body having an elongated guide portion providing a shoulder engageable with at least one of a pair of laterally spaced members for locating the jig with respect thereto, said body further having an elongated depending portion insertable between the pair of laterally spaced members, means on the depending portion for supporting the fastener in alignment with the opposed slots of the laterally spaced members, and means on the jig body providing a first abutment adapted for engagement with at least one of the laterally spaced members for longitudinally positioning the jig with respect thereto and a second abutment engageable by the fastener for longitudinally positioning the fastener with respect to the jig.

2. For use in joining a pair of members along elongated surfaces thereof with an elongated fastener having a plurality of longitudinally and laterally spaced teeth inclined to the longitudinal axis of the fastener, the joining being accomplished by laterally inserting the fastener into opposed slots in the elongated surfaces until the fastener teeth are in engagement therewith and by displacing the fastener longitudinally in the slots, a jig for preassembling the fastener and said pair of members comprising a body having an elongated depending portion adapted for insertion between a pair of laterally spaced members, a plurality of longitudinally spaced magnets fixed on the underside of the depending portion adapted for magnetically holding the fastener thereon, said body further having an elongated guide portion providing oppositely projecting elongated lips engageable with the laterally spaced members for positioning the magnetically supported fastener in alignment with the opposed slots thereof, and means on said body providing a first abutment engageable with the laterally spaced members for longitudinally positioning the jig with respect thereto and a second abutment engageable by the end of the fastener for longitudinally positioning the fastener with respect to the jig.

3. For use in joining a pair of members along elongated surfaces thereof with an elongated fastener having a plurality of longitudinally and laterally spaced teeth inclined to the longitudinal axis of the fastener, the joining being accomplished by laterally inserting the fastener into opposed slots in the elongated surfaces until the fastener teeth are in engagement therewith and by displacing the fastener longitudinally in the slots, a jig for preassembling the fastener and said pair of members comprising a body having a generally T-shaped transverse configuration and comprising an elongated depending portion adapted for insertion between a pair of laterally spaced members and an elongated guide portion providing elongated coplanar shoulders on opposite transverse sides of the depending portion for engagement with the laterally spaced members, and a plurality of longitudinally spaced magnets fixed on the underside of the depending portion adapted for magnetically supporting the fastener thereon for positioning the magnetically supported fastener in alignment with the opposed slots in the pair of members.

4. The jig of claim 3 further comprising means for longitudinally positioning the jig body with respect to the laterally spaced members and for longitudinally positioning the fastener with respect to the jig body.

References Cited by the Examiner

UNITED STATES PATENTS

| 3,045,620 | 7/1962 | Buck | 269—8 X |
| 3,079,191 | 2/1963 | Engelsted et al. | 269—8 X |

ROBERT C. RIORDON, *Primary Examiner.*

FRANK R. SUSKO, *Examiner.*